(12) United States Patent
Janssen

(10) Patent No.: US 6,773,022 B2
(45) Date of Patent: Aug. 10, 2004

(54) STEP-CYCLE FOR EXERCISE, RECREATION, AND TRANSPORT HAVING TELESCOPICALLY MOVABLE PEDALS

(76) Inventor: Dean R. Janssen, 5441 NW. 58th Ter., Coral Springs, FL (US) 33067

( * ) Notice: Subject to any disclaimer, the term of this patent is extended or adjusted under 35 U.S.C. 154(b) by 0 days.

(21) Appl. No.: 10/262,726

(22) Filed: Oct. 1, 2002

(65) Prior Publication Data

US 2003/0030245 A1 Feb. 13, 2003

Related U.S. Application Data

(63) Continuation-in-part of application No. 09/713,814, filed on Nov. 15, 2000, now Pat. No. 6,485,041.

(51) Int. Cl.⁷ .............................. B62M 1/00; B62M 1/04
(52) U.S. Cl. ....................................................... 280/221
(58) Field of Search ................................. 280/200, 210, 280/221, 252, 278, 220, 241, 251–253, 279, 288.1, 288.4, 282, 270, 304, 293

(56) References Cited

U.S. PATENT DOCUMENTS

| | | | |
|---|---|---|---|
| 1,800,123 A | * | 4/1931 | Wagen ........................ 280/221 |
| 4,828,284 A | * | 5/1989 | Sandgren .................... 280/221 |
| 5,192,089 A | | 3/1993 | Taylor |
| 5,294,140 A | * | 3/1994 | Rinkewich ................... 280/221 |
| 5,368,321 A | | 11/1994 | Berman et al. |
| 5,520,401 A | | 5/1996 | Mohseni |
| 5,938,568 A | | 8/1999 | Maresh et al. |
| 5,997,445 A | | 12/1999 | Maresh et al. |
| 6,485,041 B1 | * | 11/2002 | Janssen ....................... 280/221 |
| 6,648,353 B1 | * | 11/2003 | Cabal .......................... 280/221 |
| 6,659,486 B2 | * | 12/2003 | Eschenbach ................ 280/221 |

* cited by examiner

Primary Examiner—Lesley D. Morris
Assistant Examiner—Matt Luby
(74) Attorney, Agent, or Firm—Malin, Haley & DiMaggio, P.A.

(57) ABSTRACT

A bicycle for providing stair-stepping exercise motion, recreation, and mode of transport comprising a frame that includes a unique triangular rear portion, a pair of wheels, one for the front, one for the back, a chain driven, teardrop-shaped propulsion system, left and right pedals having multiple positions between a horizontal and angular vertical upon which the operator rides, adjustable handle bars for steering, and a safety housing for covering the propulsion and wheel sprockets, chain, braking mechanism, and bike stand. In an alternate embodiment the pedals on each side may be made of telescopic members to provide reciprocal motion so that the forward end of the pedal does not move reciprocally. Also a terrain engaging frame extension is provided below the middle portion of the frame for engaging terrain objects to prevent the pedals from engaging the terrain during activation.

3 Claims, 9 Drawing Sheets

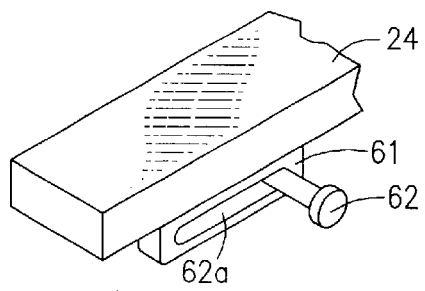
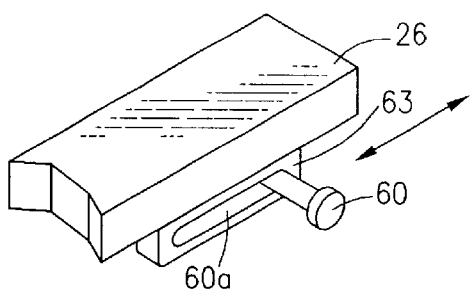
FIG. 5A
FIG. 5B
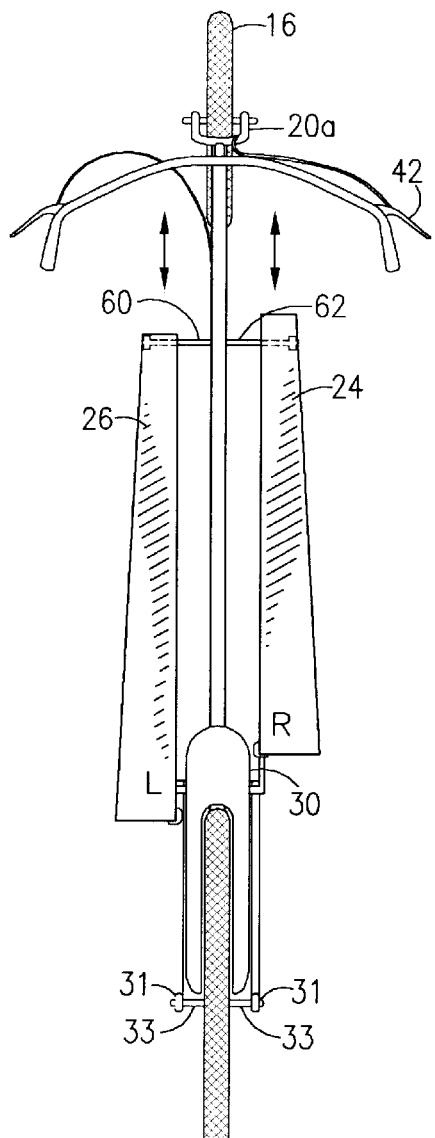
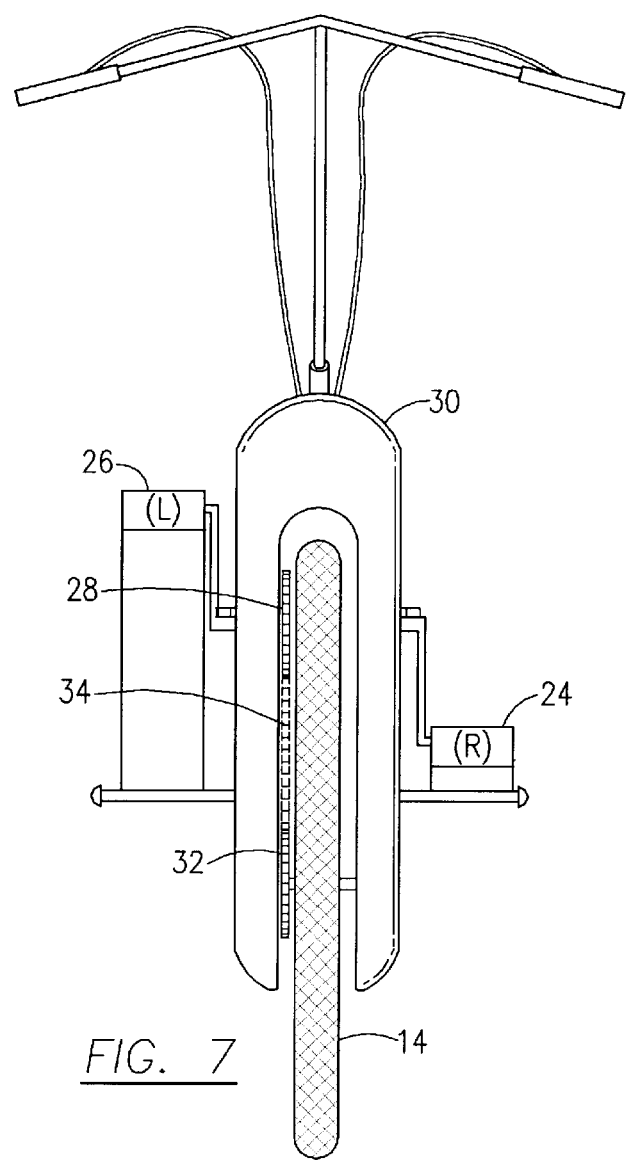
FIG. 6
FIG. 7

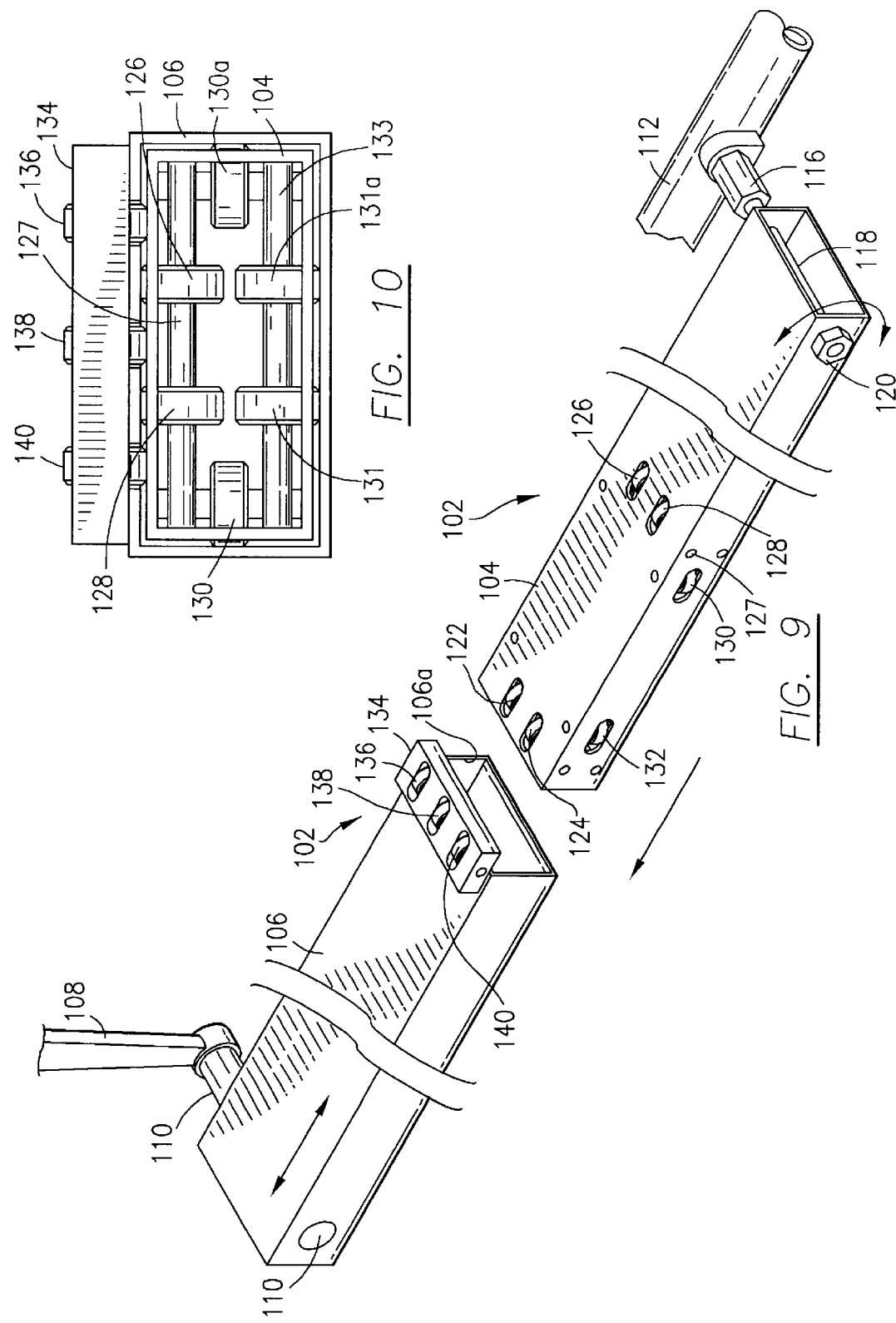

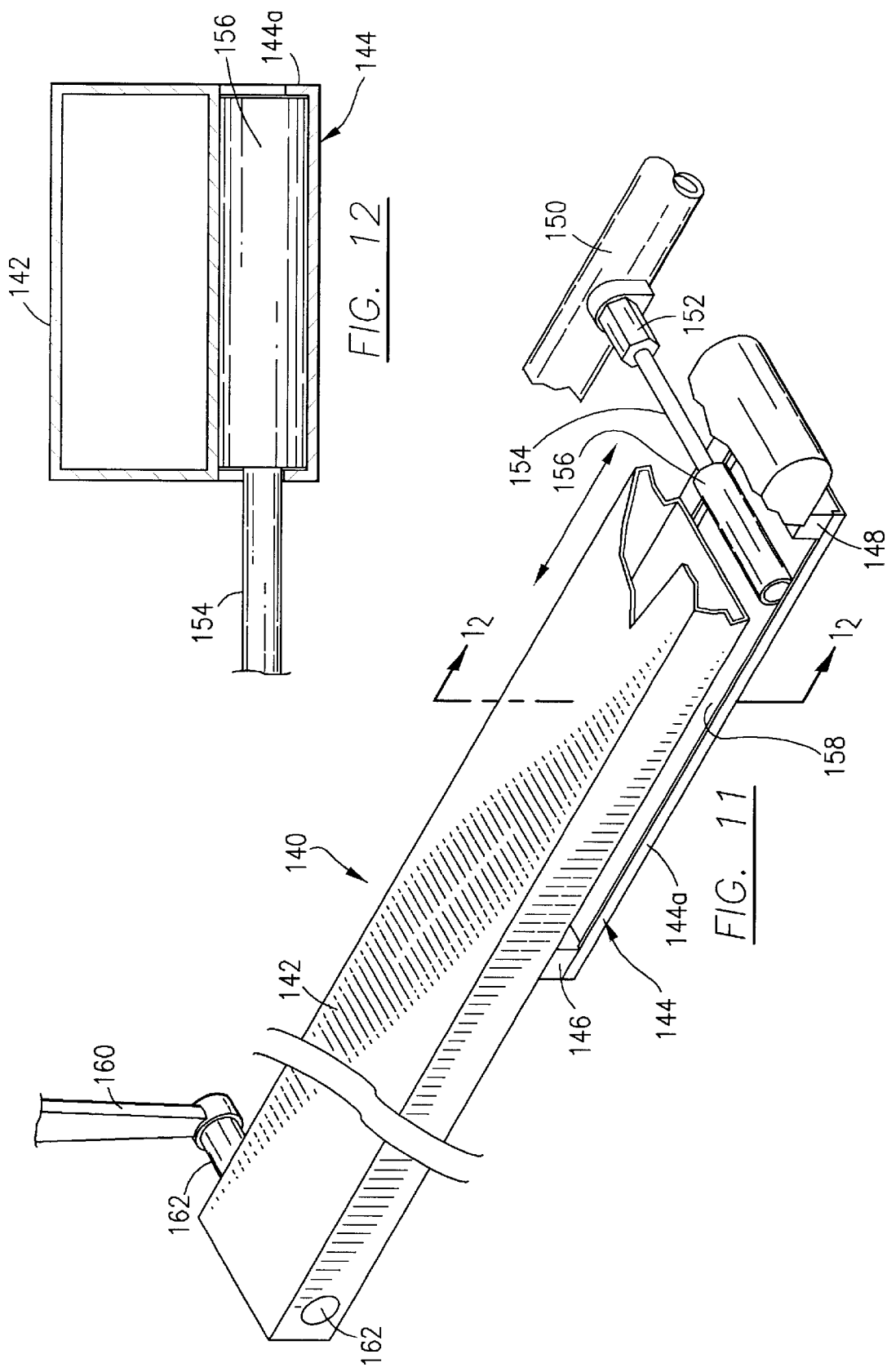

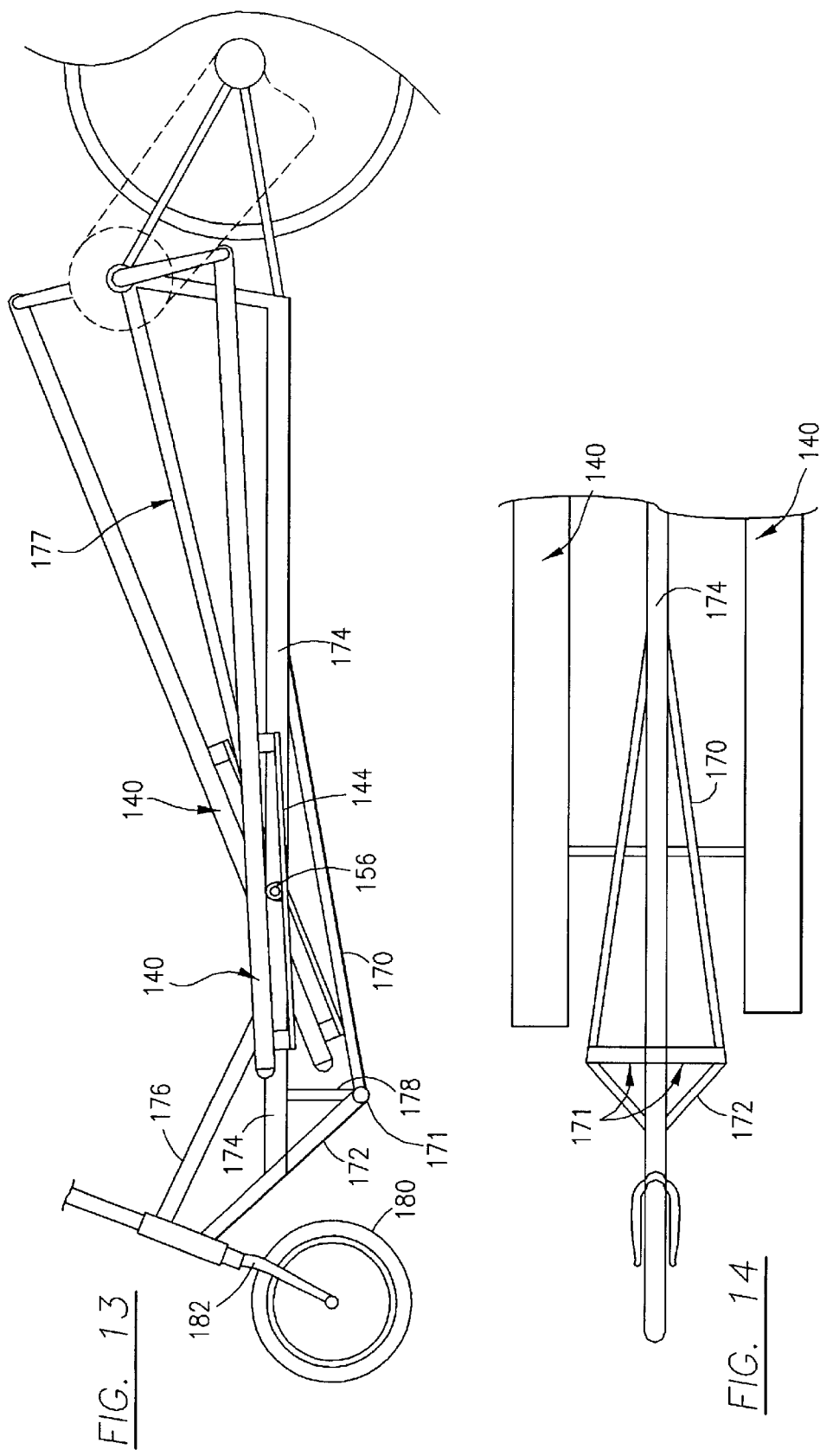

US 6,773,022 B2

STEP-CYCLE FOR EXERCISE, RECREATION, AND TRANSPORT HAVING TELESCOPICALLY MOVABLE PEDALS

This application is a continuation in part of U.S. patent application Ser. No. 09/713,814 filed Nov. 15, 2000, now U.S. Pat. No. 6,485,041.

BACKGROUND OF THE INVENTION

1. Field of the Invention

This invention relates generally to manually propelled bicycles, and more specifically to exercise, recreation, and transport bicycles that include a pedal and chain mechanism having a teardrop motion that allows for stair-stepping type exercise propulsion during transport of the bicycle.

2. Description of Related Art

The use of bicycles for exercise, recreation, and transport and other activities such as racing is well known in the prior art. On a conventional bicycle the operator traditionally sits on a seat and the pedal motion is essential circular. The use of chain, multiple gears and clutch mechanisms in conjunction with the pedal and sprocket are well known to provide for different gear ratios between the pedal sprocket and the rear wheel and a clutch mechanism that allows the bicycle to continue to coast forward when the pedals are stopped at any position.

One of the problems with a conventional bicycle from an ergonomic standpoint is that the operator is in a seated position, performing mechanical work in a relatively stressful position—bent forward at the waist, relying predominantly upon his/her quadricep muscles for propulsion and exercise. By placing the body in an upright position, the most efficient body position is achieved, utilizing a full complement of lower extremity muscles.

Stair-stepping type exercise is also known in the art. The objective is to decrease stress on the spine, joints, and lower extremities and to simulate walking upstairs for increased aerobic value. It is the intent of this invention to effectively combine the stair-stepping activity with recreational riding and transport by a bicycle.

There are devices shown in the prior art that attempt to provide a minimum form of exercise using pedals in an up and down motion. U.S. Pat. No. 5,192,089 issued Mar. 9, 1993, to Taylor shows a pedal operated scooter that includes cables, pulleys, and tension devices. The device is complex having a propulsion unit including multiple opposing sprockets and cables. The pedal mechanism is pivotal centrally.

U.S. Pat. No. 5,368,321, issued Nov. 29, 1994 to Berman et al., shows a dual footboard low profile exercise cycle. This device employs a chain and sprocket mechanism that is overly complex, expensive and does not provide a teardrop motion. It is believed that the teardrop motion provides better exercise results as a more natural movement for a person in the upright stair-step action. No related art presents a coupled oscillating teardrop motion.

U.S. Pat. No. 5,520,401, issued May 28, 1996 to Mohseni, shows a step drive cycle, having a conventional bicycle type configuration with a very complex proportioned system utilizing a plurality of belts and pulleys not in the present invention.

The present invention overcomes the problems in the prior art by providing a bicycle frame profile specially suited to a teardrop and stair-stepping type motion with a noncomplex propulsion system having conventional sprockets, multi-gear and clutch mechanism configured to provide for safe, stable, and efficient stair-stepping motion. The frame configuration insures that each pedal achieves a horizontal position upon a complete and full downstroke of each foot pedal. The invention also includes a spring-loaded, cable-controlled bike stand encased within the protective housing which allows the unit to be stationary in an upright position when not in use.

BRIEF SUMMARY OF THE INVENTION

A bicycle for providing stair-stepping exercise motion, recreation, and mode of transport comprising a frame that includes a unique triangular rear portion, a pair of wheels, one for the front, one for the back, a chain driven, teardrop-shaped propulsion system, left and right pedals having multiple positions between a horizontal and angular vertical upon which the operator rides, adjustable handle bars for steering, and a safety housing for covering the propulsion and wheel sprockets, chain, braking mechanism, and bike stand.

The frame is constructed of a tubular, light weight, strong material such as steel or aluminum, and includes a unibody designed center portion with front and rear stabilizing frame supports, a triangular rear frame portion which consists of a center vertical strut, two upper rear frame connectors, and two lower rear frame connectors which connect the rear wheel and the propulsion sprocket to the frame, and a forward angled frame portion that includes dual columns for retaining and attaching the front wheel of the bicycle.

The forward frame portion also includes a slightly angled yet substantially vertical tubular section to receive an adjustable height handlebar for steering. This forward frame portion may be hinged to provide for adjustable angular settings to accommodate various size operators. The steering mechanism is substantially conventional, as on a conventional bicycle in which the handlebars are connected to a pivotal fork that allows turning of the front wheel while the frame remain rigid. The forward vertical tubular section of the bicycle frame is angled upwardly to connect to or receive the handlebar support.

The rear portion of the frame includes on each side a left and right upper and lower rear frame connector that joins the rear wheel to the frame, essentially supporting the rear wheel in a fork to a main vertical strut elevated from the base of the frame. Specifically, the upper rear frame connector is superiorly angulated approximately 30–35 degrees from the center of the rear wheel, while the lower rear frame connector is inferiorly angulated from the center of the rear wheel to meet the posterior aspect of the intersection of the main vertical strut and center portion of the unibody frame. A superior sprocket is mounted on the superior aspect of the vertical strut at the intersection of the upper rear frame connector and the vertical strut and is connected by a conventional bicycle chain to an inferior sprocket on the rear wheel which can contain multiple gears, a clutch mechanism and a conventional bicycle propulsion unit at the rear wheel. The lower rear frame connector is angled such that the entire frame, especially through its middle portion, is completely horizontal to the riding surface and is about 6 to 8 inches off the ground. Preferably the rear wheel will be larger in diameter than the front wheel to allow adequate ground clearance of the most inferior aspect of the chain mechanism and protective housing cover, to allow adequate ground clearance of the down stroke foot pedal especially at the rear of each foot pedal, with its lowest position being horizontal to the earth and parallel to the unibody frame, to lessen the amount of work and effort required of the operator to achieve the desired speed and performance, to maintain a fairly modest standard length of the bicycle frame, thereby providing a shallower pitch and angulation of the foot pedals, thus ensuring stability and safer operation. The preferred ratio of rear to front wheel diameters is about 2:1. There appears to be no mechanical or structural advantage achieved by utilizing equal wheel dimensions, however, a step-cycle would function using equal wheel dimensions.

A pair of elongated left and right pedals are pivotally and moveably attached at the front ends to projections extending laterally from the frame on each side. The forward connection of each pedal includes an elliptical slot that securely fits the frame projections and permits front and backward motions and pivotal motion of the pedal at the front portion of the pedal.

In an alternate embodiment of the invention, each pedal that is, the left pedal and the right pedal, includes an inner member and an outer rigid member that are elongated structures, preferably metal, wherein the inner rigid member fits telescopically within a hollow passage in the outer rigid member to provide reciprocal telescopic motion between the inner member which is pivotally attached to the bicycle frame at one end, and the outer member which is rotatably attached to the actuating sprocket at its other end. The first pedal member which is smaller dimensionally than the second member includes a plurality of roller bearings or rollers which engage the interior walls of the second member passage to reduce frictional engagement between the two surfaces for ease of reciprocal motion. The second member may also include roller bearings or rollers that engage the upper outside surface of said first member during the reciprocal motion. Using the alternate embodiment having the telescopic pedals, the front forward end of each pedal is anchored in place and does not move forward, but rotates and pivots in an up and down motion. This provides that each pedal, left and right, is pivotally anchored at each end resulting in reciprocal dynamic telescopic motion, providing for the change in distance from the rear actuating sprocket arm and the front end of the pedal attached to the bike frame while providing the unique teardrop motion for the exercise of the user. The user's foot is placed on the top surface of the outer second member. There may be many different positional chambers of the revolving components mentioned which would accomplish the desired telescopic task.

In yet another embodiment, an improved pedal motion is provided that includes roller wheel bearings connected on a connector pin shaft mounted to the frame at the front of the pedal, and a large slotted area which may be externally encased beneath the pedal or internally encased within the pedal for the roller bearings to permit forward and backward motion of the pedal during activation in a smooth and efficient manner, reducing friction.

In yet another embodiment, the frame of the bicycle can be constructed to include a safety bar, forward of the pedal connection and lower than the pedal connection, such that over different types of terrain the guard frame would engage the earth or ground before the pedals to prevent the pedals from digging in to uneven terrain. The forward most movement of each pedal would thus be protected by a guard frame below the main frame of the bicycle.

The superior propulsion sprocket mounted on the superior aspect of the main vertical strut includes two sprocket arms extending and rigidly affixed to the sprocket in opposite 180-degree directions that have connectors that connect to the rear end portion of each pedal which permit rotational movement of the rear portion of the pedal.

In its lowest downstroke position, one pedal would be horizontal to the frame and the ground, and the opposite pedal will be in its most angulated/pitched position while in its highest upstroke position.

A protective housing is used to encase the superior and inferior rear sprocket propulsion system, the rear braking mechanism, chain, and bike stand of the rear wheel. This housing is made of a bi-fold, durable plastic which is designed to prevent any interaction between these components and the operator or the operator's clothing. This bi-fold design is held together with 4–5 easy turn screws or may be joined together by fasteners that allow for easy access to these components.

Within the protective housing is also a spring-loaded, cable-controlled, moveable, rotatable, rigid bar that has two positions, up or down, that acts as a bike stand to allow support of the bicycle in an upright position when it is not being operated. The bike stand is stored within the protective housing when not in use. The cable-controlled bike stand utilizes two springs, one large and one small. The large spring with stronger tension is used to set the bike stand into the lowered "released" position. This spring attaches the bike stand to the fixed side of the rear wheel protective bi-fold cover. The small spring with lighter tension is connected to a stopper/latch which holds the bike stand in the upright "locked" position. A first cable end will connect to the small spring loaded stopper/latch, while a second cable end is connected to a handlebar lever accessible to the rider. By simply tightening the handlebar lever, the small spring connected to the stopper latch will compress and shorten, releasing the larger spring and bike stand into the lowered "released" position.

The operator can stand on each pedal and apply downward pressure on one of the pedals to begin propulsion of the bicycle, thereafter alternating this stair-step action between pedals. This continued stair-stepping motion can be continuously applied or the operator can stop the stair-step motion and the bicycle will continue to coast because the sprocket clutch allows free wheeling of the bicycle in a forward direction when the pedals are not being operated. During operation of the stair-stepping motion on the propulsion unit, each pedal can move backwards and forwards at the forward portion of the pedal and circularly at the rear portion of the pedal providing an overall natural teardrop exercise motion. The low angled frame of the bicycle is very stable and reduces the center of gravity. The triangular rear frame portion includes one main vertical strut, two lower rear frame connectors, and two upper rear frame connectors, which are angled at approximately 30 to 35 degrees and provide the proper orientation and range of motion of the pedals during exercising while providing a noncomplex propulsion unit using conventional bicycle sprockets and a multiple gear mechanism.

Conventional type brake pads are uniquely positioned on the two lower rear frame connectors, angled superiorly and obliquely. These brake pads are covered by the protective housing. These rear brake pads create drag on the bicycle rear tire from a hand actuated hinged handle mounted on the handlebars to which the brake cables are connected. Front brake pads will be utilized in the same conventional manner on the front wheel.

It is the object of this invention to provide an improved bicycle for exercise, recreation, and transport which uses a teardrop stair-stepping motion to propel the bicycle.

Yet another object of this invention is to provide an improved bicycle construction utilizing a substantially conventional sprocket and chain technology in a noncomplex way to provide a stable platform for a teardrop stair-stepping exercise and mode of transportation.

Another object of this invention is to provide a smooth almost frictionless motion of the pedals for the user to perform the teardrop motion for exercise by providing each pedal with a reciprocal, telescopic pair of elements.

Another object of the invention is to provide a bicycle with a safety bar guard rail affixed to the frame below the lowest frame member of the bicycle to protect if impacting objects or rugged terrain during operation to prevent the pedals from being engaged in the ground.

Additional objects, advantages, and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 5A shows a side elevational perspective view of the right pedal, support block, connector pin and elongated slot.

FIG. 5B shows a side elevational perspective view of the left pedal, support block, connector pin, and elongated slot.

FIG. 6 shows a top plan view of the present invention.

FIG. 7 shows a rear elevational view of the present invention as if in motion.

FIG. 9 shows an alternate embodiment of the invention and in particular, a perspective view of a pedal in accordance with the alternate invention that has telescopic action reciprocally.

FIG. 10 is a front elevational view of the alternate embodiment of the invention shown in FIG. 9 with the first rigid member telescopically inside of the second rigid member, without showing the end connectors for clarity.

FIG. 11 shows another alternate embodiment of the invention including a perspective view of a pedal partially cutaway that includes a roller wheel bearing mounted in an elongated slot beneath the pedal to provide for reciprocal motion.

FIG. 12 shows a cross sectional view along line 12—12 of the alternate embodiment shown in FIG. 11.

FIG. 13 shows a side elevational view partially cutaway of the forward portion of the bicycle including the embodiment of FIG. 11, and in addition, a guardrail mounted below the frame.

FIG. 14 shows a bottom plan view of the forward section of the bicycle with the alternate embodiment shown in FIG. 13.

PREFERRED EMBODIMENT OF THE INVENTION

Figure 1:
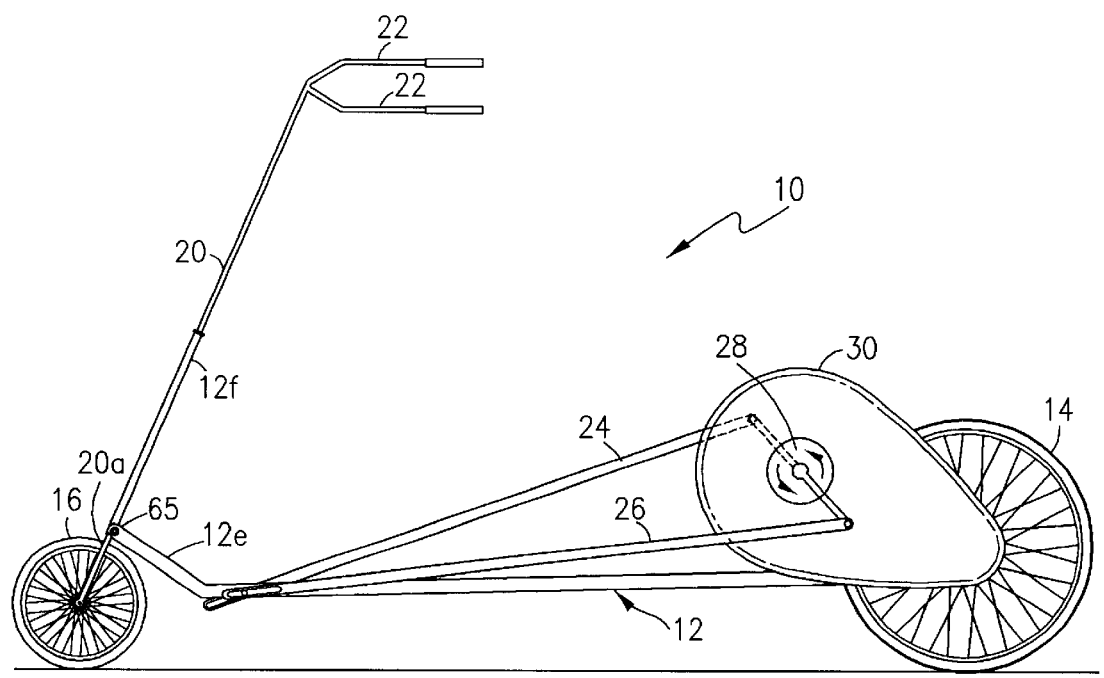
FIG. 1 shows a side elevation of the present invention.

Referring now to FIG. 1 the present invention is shown generally at 10 comprised of a rigid tubular metal, aluminum or steel, frame 12 connected to a pair of inline wheels the front wheel 16 and rear wheel 14, that includes a propulsion system having a sprocket 28 mounted on the frame and a pair of pedals, right 24 and left 26, which are utilized to propel the vehicle forward. The bicycle includes a pair of conventional handlebars 22 connected to a rigid adjustable handlebar support 20, a single rod that telescopes into a hinged tubular frame member 12f, which is adjustable forward and backward at hinge 65 for ease and safety of use by a variety of sized operators, said hinge intersects at the distal end of the forward frame section 12e of frame 12. From the hinged tubular frame member emanates a pair of rigid arms 20a that are connected to the front wheel 16. Handlebar support 20 and rigid arms 20a rotate about the inside of frame portion 12f in a conventional way and are mounted to be held in position conventionally. The steering mechanism does not form any part of the overall invention.

Figure 5:
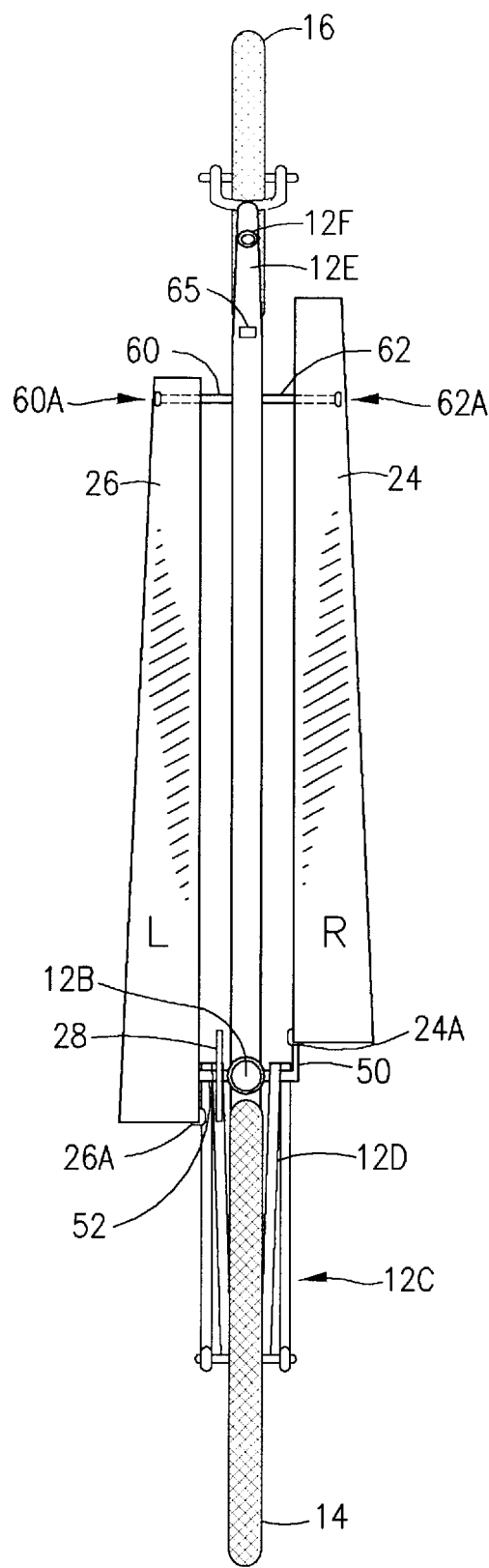
FIG. 5 shows a top plan view of the frame and propulsion sprocket utilized in the present invention.

The right pedal 24 and left pedal 26, which are connected at the front end of each pedal to projections 62 and 60 respectively, extending laterally from the frame 12 as shown in FIGS. 5 and 6, permit a coupled back and forth at the front as well as circular motion at the rear of the pedal, creating an overall teardrop motion. The propulsion mechanism unit is covered by a safety housing 30 to prevent interaction with the sprockets, chain, braking mechanism and bike stand by operator or the operator's clothing during operation.

Figure 2:
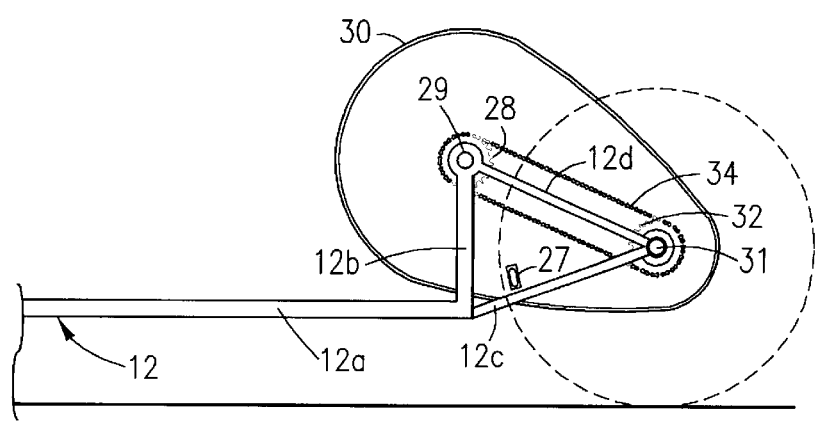
FIG. 2 shows a side elevational view of the rear portion of the present invention partially cut away, showing the propulsion mechanism of the present invention.

Referring now to FIG. 2, the propulsion system and frame arrangement is shown. The overall unitary rigid frame 12 includes a middle portion 12a which terminates posteriorly at the intersection of the inferiormost aspect of the main vertical strut and the lower rear frame connector 12c. The vertical strut 12b rigidly attached thereto terminates superiorly at the propulsion sprocket 28. The lower rear connector 12c connects and forms a triangle with the upper rear frame connector 12d at the center of the rear wheel. The frame shows the same on each side of the bike so there are two separate right and left triangular frames that are used to support a rear wheel 14 through inferior sprocket 32 and rear wheel axle 31. During pedaling, superior sprocket 28 rotates and moves chain 34 thus driving sprocket 32, which may be a multiple gear conventional bike sprocket including a free wheeling clutch. The upper rear frame connector 12d is angled and preferably supports a standard 24-inch or 26-inch bicycle wheel; however, a larger or smaller wheel may function as well. The fixated side of the housing 30 is shown which would actually cover sprockets 28 and 32 in such way as to protect the operator, the operator's clothing or other articles from engaging the chain 34, rear brake pads 27, or the sprockets 28 and 32. The housing 30 comprises two pieces, a fixated side and detachable side which can be removed to allow access to the mechanism within when necessary. Superior propulsion sprocket 28 has a pair of radial arms 50 disposed at 180 degrees to each other one on each side of the sprocket where the vertical axle 29 through the sprocket 28 connects to the rear end of the pedals (not shown in FIG. 2) to permit propulsion and rotation of the sprocket mechanism 32 and therefore the rear wheel 14. The position of the rear brake pads 27, attached to the lower rear frame connector 12*c*, is shown within the protective housing 30.

The rear wheel 14 is positioned between the upper and lower rear frame connectors 12*d* and 12*c*, respectively. As previously described, the steering mechanism and front braking system is conventional as in a normal bicycle. The front brake pads 25 shown in FIG. 4 are activated in a conventional manner.

Figure 3:
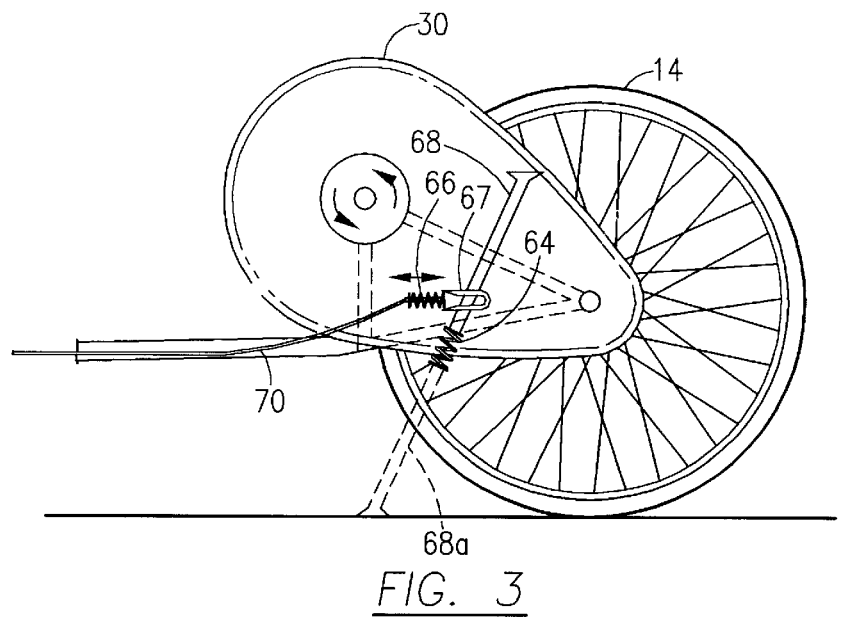
FIG. 3 is a side elevational view of the rear portion of the frame and rear wheel showing the bike stand released in use and in latched position hidden behind housing during non-use.
Figure 8:
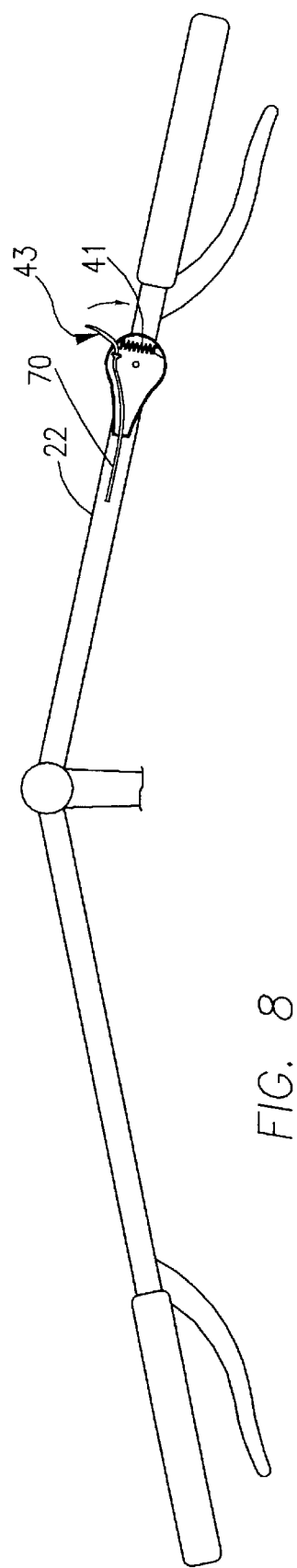
FIG. 8 shows a forward perspective view of the handlebar assembly from the view of the rider and positioning of the kickstand activation mechanism.
Figure 8A:
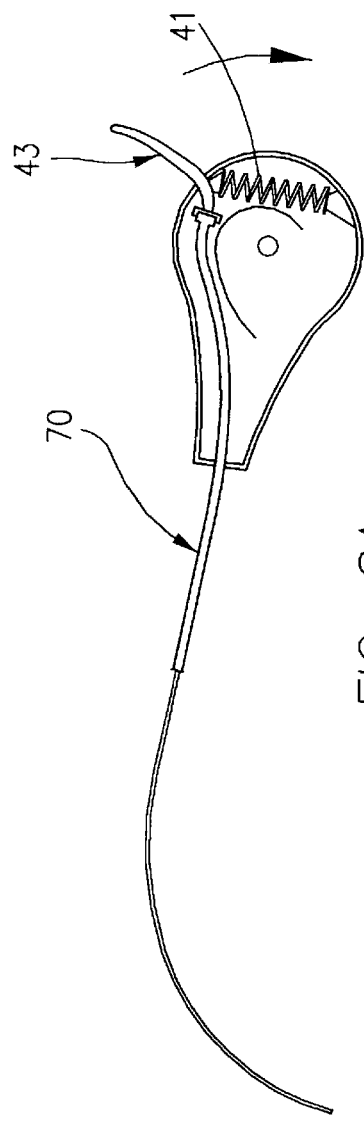
FIG. 8A is a close-up of circled portion of FIG. 8, showing the kickstand activation mechanism.

Referring now to FIGS. 3, 8, and 8A, the spring-loaded, cable-controlled bike stand 68 used to support the bicycle when it is not in use. Upon hand-controlled activation of cable 70 via compression of the spring 41 connected to the hand-controlled lever 43 on handlebars 22, the spring 66 releases a stopper latch 67 which in turn activates spring 64, allowing the bike stand to rotate downward into an anteriorly angular support position in direct ground contact. The bike stand 68 is angulated in both the locked and released positions approximately 180 degrees apart, allowing adequate clearance from the revolving foot pedal/levers in any stopped position and more central contact with the ground for optimal stability between the front wheel and rear wheel. The preferred angulation of the bike stand in stored and retracted non-use position is perpendicular to the upper rear frame connector 12*d*. Upon cable 70 activation, the bike stand rotates anteriorly, and downward from behind the housing 30 to position shown as 68*a*.

Figure 4:
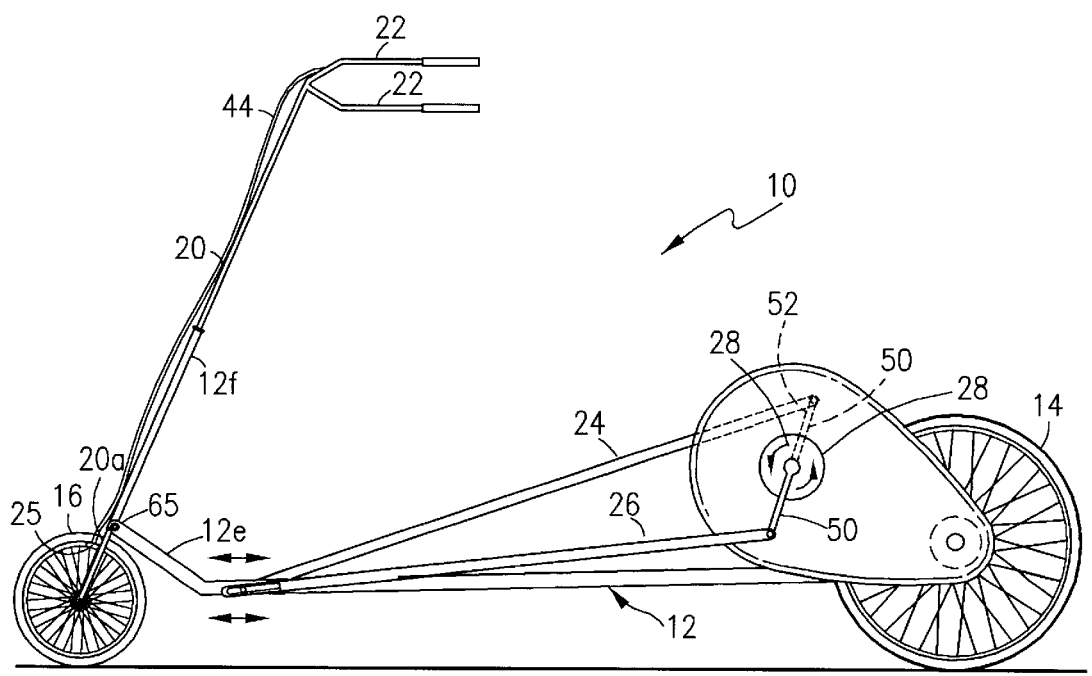
FIG. 4 shows a side elevational view of the present invention.

Referring now to FIG. 4, the pedal mechanism is shown with right pedal 24 and left pedal 26 as elongated substantially rectangular rigid planar members. The left foot pedal 26 is connected on the left side of the bicycle of frame 12. The right foot pedal 24 is connected on the right side of the bicycle frame 12. Pedal 24 includes at its forward end a pedal mount, shown in FIGS. 5A and 5B having an elongated slot 62*a* on the right and 60*a* on the left along its longitudinal length connecting rigidly to the bottom side of the right pedal 24 or left pedal 26. Alternatively, these right and left pedal mounts 61 and 63 may be internally encased within the anterior portion of each foot pedal. The frame 12 includes a lateral rigid connector pin 62 on the right side and 60 on the left side that is interlocked into the elongated pedal mount slot 62*a* on the right side and 60*a* on the left side which in effect allows each pedal to proceed in a backward and forward coupled motion while at the same time allowing the pivotal motion relative to frame 12. The elongated pedal mount slot 60*a* is shown in FIG. 5B is the left side counterpart to 62*a* on the right side shown in close up in FIG. 5A. This provides for the teardrop motion described herein.

The superior propulsion sprocket 28 has a pair of arms 50 on the right and 52 on the left each of which respectively engages a different foot pedal, 24 on the right, 26 on the left. The arms 50 and 52 are approximately 180 degrees apart and project radially from the center of sprocket 28. Arm 50 is moveably connected to the rear connector of right foot pedal 24. The left foot pedal 26 is connected at its end to arm 52. Thus it is seen that when the bicycle is propelled by pushing down on the upside foot pedal, for example the right foot pedal 24 shown in FIG. 4, arm 50 would rotate sprocket 28 connected to the chain that rotates the rear wheel 14. The front of right foot pedal 24 moves in a back and forth motion within the pedal mount elongated slot 62*a* connected to the frame and connector pin 62 and in the rear section it will rotate relative to the connecting arm 50 in a circular fashion. The left foot pedal 26 moves in a back and forth motion within pedal mount elongated slot 60*a* connected to the frame and projection pin 60 and in the rear section it will rotate relative to the connecting arm 52 in a circular fashion, the result being a coupled teardrop motion for each foot pedal. Because of the multiple gears and axle structure that includes a coasting clutch while the vehicle is operating, the operator can stop all foot movement and coast with the vehicle as a conventional bicycle.

The low center of gravity of the bike is due to its unusual design, specifically achieved by its larger rear wheel and smaller front wheel, as well as its unique superior angulation of the lower rear frame connector, allowing the bicycle to sit lower to the ground while providing maneuverability and stability during operation.

In FIG. 5 the handlebars 22, handlebar support 20, and protective cover 30 are removed. The upper rear frame connector 12*d* is connected to the superiormost aspect of the vertical strut 12*b* while the lower rear frame connector 12*c* is connected to the inferiormost aspect of the vertical strut 12*b* to form the rigid triangle shown in FIG. 2. The right pedal 24 is connected to a rigid projection 62 within slot 62*a* described below. Rear portion of the pedal 24 is connected to arm 50 from the sprocket 28 and is on a ball-like revolving connector 24*a* to permit total freedom of movement between the circular rotations of the rear end of pedal 24 through connector 24*a*. Likewise the left pedal 26 has a rear connector 26*a* that is attached to the arm 52 that connects the sprocket 28 and is on a ball-like revolving connector 26*a* with the rear end of pedal 26 which like pedal 24 rotates in a circular path or line of movement like that explained for right pedal 24.

Referring to FIG. 5A, in closeup a pedal mount 61 that includes an elongated slot 62*a* is connected to the frame by a connector pin 62 which allows the right pedal 24 to move back and forth radially relative to the frame 12. A corresponding configuration of the left pedal 26 utilizing connector pin 60, elongated slot 60*a* and pedal mount 63 in closeup is shown in FIG. 5B.

Referring now to FIG. 6 showing the top view of the device, the noncomplex nature of the pedals is revealed and are oriented for stability with the lowest path being horizontal to the earth and parallel to the frame 12. Connected to the handlebars 22 are a pair of hinged handles 42 which actuate front and rear brakes connected by conventional brake cables 44 to both the front brake pads 25 shown in FIG. 4 and rear brake pads 27 shown in FIGS. 2 and 3.

Referring now to FIG. 7, the relationship between the right pedal 24 and left pedal 26 in motion is shown. The housing 30 completely covers and protects the operator from both sprockets 28 and 32, chain mechanism 34 driving the rear wheel 14, braking mechanism, and bike stand 68 (shown in FIG. 8). When the path of motion of the right pedal 24 is in a down position parallel to the earth and the lower frame middle portion 12*a*, the left pedal 26 is in the up position, 180 degrees opposite. Both pedals operate 180 degrees out of phase between their two extreme positions. The housing 30 may be made in two sections, joined by fasteners when in use and may be made of a hard plastic or other durable suitable material.

In operation, the operator places one foot on each pedal, right 24 and left 26, and by pushing down in a step-like fashion alternating between the right and left feet, propels the vehicle forward. This alternating motion provides exercise of the legs and body in a very smooth teardrop path formed by the right and left pedals previously described. The operator can also stop pedaling and allow the bicycle to coast in a manner typical with a conventional multi-gear bicycle. The bicycle functions well as an ergonomic mode of travel between point "a" and point "b," while simultaneously providing an exercise platform which produces minimal strain, wear, and tear on the joints or bone structure of the user, in essence providing for an excellent low-impact aerobic workout.

Referring now to FIGS. 9 and 10, an alternate embodiment of the invention is shown. The purpose of the alternate embodiment is to provide an improved pedal action for each pedal, both the left pedal and the right pedal. In this alternate embodiment, the front end of each pedal is removably attached to the frame of the bicycle by a threaded connector pin to prevent forward and backward motion, but does permit rotational motion by the pedal, relative to the frame and connector pin which is described in greater detail. The left pedal and the right pedal each is constructed of an inner rigid member which is a box-shaped structure, and a larger outer rigid member that is also box-shaped and has a hollow passage that is sized on its inside passage to receive the inner member in a telescopic fashion that permits reciprocal motion between the inner rigid member and the outer rigid member. The rear end portion of the outer member is rotatably attached to the drive sprocket.

The inner rigid member 104 may include a plurality of roller bearings 122, 124, along its rear top portion and roller bearings 126 and 128 along the front top portion, connected to the inner rigid member 104 through shaft 127 and a plurality of side roller bearings 130 and 132. All of the roller bearings are mounted in slots through the rigid member 104 walls on four sides as shown on FIG. 10, with the wheel portion of the roller bearing exposed sufficiently above the outer surface on all four sides of inner rigid member 104 so that the wheel roller bearings snugly engage the inside passage 106a of rigid outer member 106. FIG. 9 is an exploded view when in practice the inner rigid member 104 would be snugly, telescopically fit on the inside passage 106a of rigid outer member 106 within the spacing between the sprocket crank arm 108 and the pivotal connecter pin 118. An additional row of roller bearings 136, 138 and 140 can be mounted and encased in top bracket 134 on the top surface of rigid outer member 106 on the outside to engage downwardly, the upper surface of rigid inner member 104. A nut 120 holds the inner rigid member 104 firmly in place, and attaches to connector pin 119 which anchors to bike frame 112 by a threaded connector pin with hexagon head 116 allowing for easy removal of front pedal and allowing for hinged pivotal motion of the first inner rigid member 104 relative to connector pin 118.

The sprocket arm 108 is connected to said rigid shaft 110 that is also rotationally connected and may include bearings to the rear end of outer rigid member 106. Together when in telescopic connection, downward movement of the pedal in which someone would be standing on outer rigid member 106, will permit rotational movement of the sprocket arm 108 in a circular motion.

The main purpose of the reciprocal telescopic pedal (which is the same on each side in a mirror image structurally) is that the forward most portion of the pedal, which is the front end of inner rigid member 104, is fixed with respect to forward and backward motion. Thus, during bicycle operation, the forward end of each pedal cannot go down below the frame but is fixed in place so that objects in the terrain will not be engaged by the forward end of the motion of the pedal. In addition this telescoping pedal feature will allow for diminished frame length and shortening of the bicycle which will become important for packaging, shipping and storage.

FIG. 10 shows a front elevational view showing the engagement of the numerous roller bearing on the inside of second rigid member 106. The connecting pin 118 and 110 rigid shaft are not shown for clarity reasons, although the axles for the roller bearings such as 133 are shown that carries roller bearings 131 and 131a.

Referring now to FIG. 11 and FIG. 12, an improved alternate embodiment of the invention is shown that is again a pedal structure 140 that greatly enhances and smoothes out the reciprocal motion of the pedal. The pedal 140 which would be the same on each side, whether it is the left pedal or right pedal, is shown in this embodiment in FIG. 11 as the right pedal so that the sprocket crank arm 160 which is the main sprocket drive arm, is pivotally and rotationally connected by rigid shaft 162 to the rigid pedal member 142 that permits circular motion of the rigid pedal member 142 relative to shaft 162. The rigid pedal member 142 which receives the user's foot on the top surface, could be rigid or hollow but includes a lower extension 144 that is connected to the underside pedal 142 by spacers 146 and 148, one at each end of the bearing casing 144. The bearing casing 144 is a rigid surface with a lip 144a including an interior, elongated slotted portion 158 that receives roller wheel bearing 156 that includes internal bearings to reduce friction and permits rotational movement of the bearing 156 reciprocally within the slotted area 158 formed by bearing casing 144. The pedal 142 is shown broken away to disclose the roller wheel bearing 156 which is attached by a connector pin 154 to the frame 150 of the bicycle by a threaded connector pin with the hexagon head 152 allowing for easy removal of roller 156 and pedal 142.

The purpose of the embodiment that is shown in FIG. 11 is to improve the reciprocal pedal action and reduced friction for smooth actuation during riding. The motion is still the same in that the sprocket crank arm 160 travels in a circle so that the rear portion of pedal 142 attached to shaft 162 rotates in a circular motion while the forward end of the pedal is attached to the roller bearing 156 and both pivots circularly and reciprocally to provide the unique tear drop motion of the pedals during actuation.

FIG. 12 shows an end elevational view of the snug fit of the cylindrical roller bearing 156 mounted within the bearing casing 144. Note the lip 144a that holds the roller bearing 156 within the interior slotted portion 158. The bearing 156 rotates relative to pin 154.

Referring now to FIG. 13, another alternate embodiment which improves the frame structure of the bicycle as shown. A guard rail 170 includes framing members that are disposed below the horizontal frame member 174 and includes an extender 178 that is also connected to a cross bar 171 which projects laterally to the inner most portion of a depressed pedal. As shown in FIGS. 13 and 14 the guard frame having rigid metal frame bars 170 and 172 extend down below the bottom frame member 174 with the purpose being to protect the pedals 140 which are moving in a reciprocal motion from engaging any terrain objects or the ground in un-level areas during motion of the pedals. The frame guard 172 will strike an object first, preventing the pedals from engaging, which might be disruptive when pedaling the device upon terrain that is not flat. Along with front and rear stabilizing frame supports 176 and 177 frame guard also improves the structural integrity of the entire bicycle for supporting greater weight loads by including additional rigid bar members which may be metal tubes that are welded in place.

Figure 15:
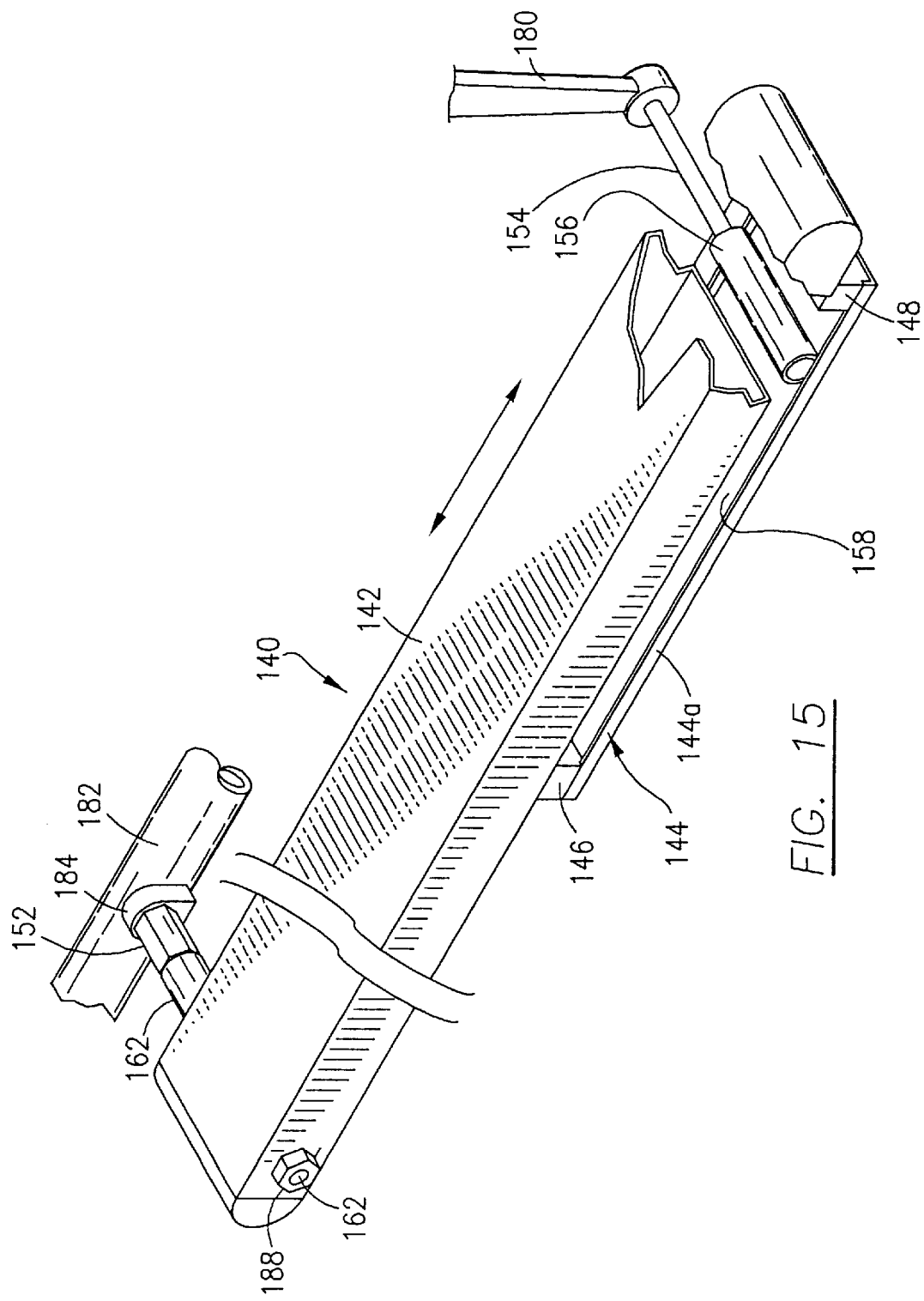
FIG. 15 shows a perspective view, partially cutaway, of yet another alternate embodiment of the pedal and its connection to the sprocket arm and the bicycle frame.

In yet still another embodiment of the invention, the pedal, shown in FIG. 11 with the elongated slot, can be modified in the alternate embodiment as follows. Referring now to FIG. 15, the alternate embodiment of the invention is shown, which includes pedal 142 including the slot structure 144 as described above now connected in reverse order between the sprocket crank arm 180 and the rigid frame 182. In this embodiment, the forward end of the pedal 142 is connected by nut 188 pivotally to pin 162 which is removeably connected to frame 182 through hexagonal headed nut 152. Thus the forward end of the pedal can be disengaged from the frame 182 by hexagon headed nut 152 and nut 188. In operation the pedal 142 will pivot rotationally around the pin 162. At the other end of pedal 142, the cylindrical roller 156 is connected through arm 154 rotationally to the sprocket crank arm 180. In this particular embodiment, therefore, the front of the pedal is rigidly connected to the frame and allows only rotational or pivotal movement about pin 162 while at the rear portion of the pedal as the sprocket crank arm 180 rotates, the cylinder 156 can move back and forth within slot 144 to provide the same desired motion on the pedals.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A bicycle for recreation, exercise, and transport comprising:

a unibody frame having forward, middle, and rear sections wherein said rear section comprises a vertical strut member extending vertically from the rear end of said middle frame section, the opposite end of which connects at an angle to an upper rear frame connector bar terminally connecting to said vertical strut to form a triangular rear frame section;

said rear frame section including a slot for receiving a bicycle wheel axle;

a steering member connected to the forward portion of said frame having a front wheel and axle disposed at one end of said steering member and a pair of handlebars and a handlebar support bar adjustably connected to the opposite end of said steering member;

a rear wheel connected to the rear frame section said rear wheel including a sprocket, wheel axle and coasting means to allow the bike to coast when the pedals are inactivated;

a propulsion sprocket connected to the top of said vertical strut frame member having connected thereto the rear wheel sprocket and axle;

a chain connected between said propulsion sprocket and said rear wheel sprocket;

said middle frame section including a right rigid connector pin disposed on the right side of said unibody frame and a left rigid connector pin disposed on the left side of said unibody frame;

a left bicycle pedal and right bicycle pedal each including a first rigid support member and a second rigid support member, said first rigid support member mounted inside said second rigid support member telescopically and being reciprocally movable between said first rigid support member and said second rigid support member;

said second rigid support member being connected at its rear end to said propulsion sprocket and said first rigid support member being pivotally connected at its front portion to said bicycle frame; said left pedal connected at approximately 180 degrees from said right pedal sprocket connection;

whereby said right pedal and said left pedal provide reciprocal motion at each pedal, thereby providing a telescopic teardrop motion when pedaling said bicycle.

2. A device as in claim 1, wherein said middle frame comprises front and rear stabilizing supports for strength and stability to the middle frame.

3. A bicycle, comprising:

a left bicycle pedal and a right bicycle pedal, each including a first rigid support member and a second rigid support member, said first rigid support member mounted inside said second rigid support member telescopically and being reciprocally movable between said first rigid support member and said second rigid support member;

wherein said right pedal and said left pedal have a substantially linear movement at a front end thereof, and a substantially circular movement at a rear end thereof, thereby providing a teardrop motion when pedaling.

* * * * *